D. B. McRAE.
CIRCULAR-SAWS.
No. 193,985. Patented Aug. 7, 1877.
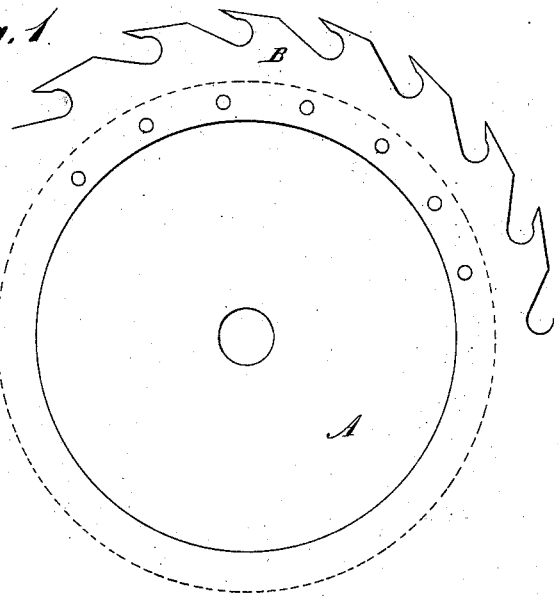
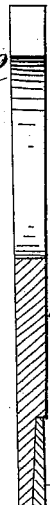
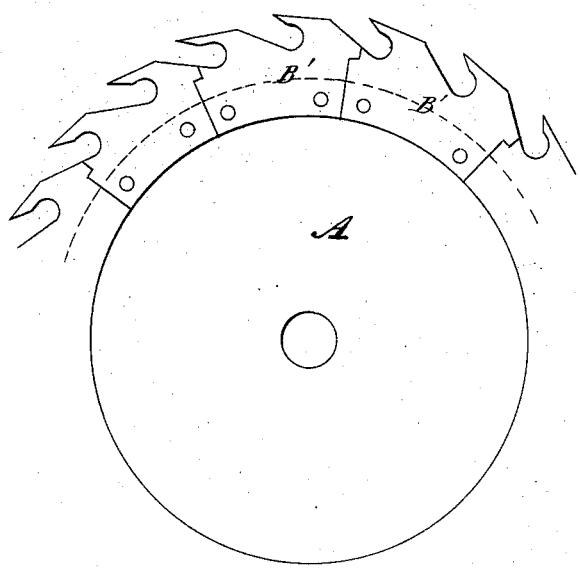
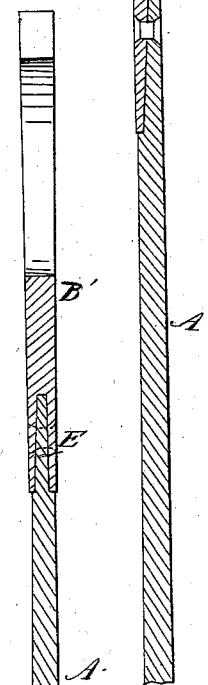
WITNESSES:
C. Neveux
John Goethals
INVENTOR:
D. B. McRae
BY
Munn & Co.
ATTORNEYS.

UNITED STATES PATENT OFFICE.

DONALD B. McRAE, OF BAY CITY, MICHIGAN.

IMPROVEMENT IN CIRCULAR SAWS.

Specification forming part of Letters Patent No. 193,985, dated August 7, 1877; application filed June 12, 1876.

*To all whom it may concern:*

Be it known that I, DONALD B. MCRAE, of Bay City, in the county of Bay and State of Michigan, have invented a new and useful Improvement in Saws, of which the following is a specification:

The object of my invention is to provide for renewing the teeth of large saw-plates in a manner not subject to the objections attending the use of what are known as "insertable teeth."

The invention consists of a sectional or solid toothed ring attached to the periphery of a plate or disk forming the body of the saw, the ring being "halved" onto the plate when made solid, and tongued and grooved when made in sections, and being riveted in both cases.

Figure 1 is a side elevation of a saw whereof the toothed ring is made solid and halved onto the plate. Fig. 2 is a section of Fig. 1. Fig. 3 is a side elevation of a saw having a toothed ring made in sections, and tongued and grooved to the plate. Fig. 4 is a section of the same.

Similar letters of reference indicate corresponding parts.

A is the disk forming the body. B is the toothed ring, made solid or complete in one piece, and attached to the periphery of the disk by a rabbet-joint formed half in the disk and half in the ring, and the two being riveted together, as shown at D. B' represents the toothed ring made in sections, and tongued and grooved to the saw-plate, and riveted, as shown at E.

In practice, the saw-plate will be the same thickness at the center as the toothed ring, but will taper or diminish slightly therefrom to the inner edge of the ring, so that the friction will be less than it is in other saws in which the plate is the same thickness from center to periphery. This is an advantage that is made possible by this arrangement of an attached toothed ring, and cannot be had in the common saws, as they cannot be ground in such forms.

I am aware that veneer-saws have been made with a thick center, not adapted or intended to run in the saw-kerf, with a toothed rim attached to the periphery; and I do not claim such arrangement broadly; but

Having thus described my invention, I claim as new and desire to secure by Letters Patent—

1. The toothed ring B or B', attached to a center disk or body-plate, A, of not greater thickness than the toothed ring, substantially as specified.

2. A saw consisting of a toothed ring and a center body-disk, attached as described, in which the disk is made as thick at the center as the ring, and diminishes in thickness therefrom to the ring, substantially as specified.

DONALD B. McRAE.

Witnesses:
   T. B. MOSHER,
   ALEX. F. ROBERTS.